United States Patent
Brownsmith (10) Patent No.: US 6,333,999 B1
(45) Date of Patent: Dec. 25, 2001

(54) SYSTEMATIC ENUMERATING OF STRINGS USING PATTERNS AND RULES

(75) Inventor: Joseph D. Brownsmith, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/187,586

(22) Filed: Nov. 6, 1998

(51) Int. Cl.[7] .................................................. G06K 9/72
(52) U.S. Cl. ......................................... 382/229; 714/36
(58) Field of Search ................................ 382/229, 228, 382/230, 231, 227, 310, 311; 714/38, 36, 45, 46, 51, 738, 739

(56) References Cited

U.S. PATENT DOCUMENTS

| | | | |
|---|---|---|---|
| 4,819,233 | * 4/1989 | Delucia et al. | ....................... 371/19 |
| 5,269,014 | 12/1993 | Ogino | |
| 5,357,452 | 10/1994 | Pio-di-Savoia et al. | |
| 5,359,546 | * 10/1994 | Hayes et al. | ....................... 364/579 |
| 5,394,347 | 2/1995 | Kita et al. | |
| 5,883,986 | * 3/1999 | Kopec et al. | ....................... 382/310 |

FOREIGN PATENT DOCUMENTS 1479122    7/1977    (GB) .

OTHER PUBLICATIONS

Bazzichi, F. et al., "An Automatic Generator for Compiler Testing," IEEE Transactions on Software Engineering, vol. SE–8, No. 4, Jul. 1982, pp. 343–353.
Bourjarwah, A. et al., "Compiler Test Suite: Evaluation and Use in an Automated Test Enviroment," Information and Software Technology, vol. 36, No. 10, 1994, pp. 607–614.
Burgess, C.J., "The Automated Generation of Test Cases for Compilers," Software Testing, Verification and Reliability, vol. 4, 1994, pp. 81–99.
Celentano, A. et al., "Compiler Testing using a Sentence Generator", Software–Practice and Experience, vol. 10, 1980, pp. 897–918.
Chandrasekharan, M. et al., "Requirements–Based Testing of Real–Time Systems: Modeling for Testability," IEEE Computer, Apr. 1985, pp. 71–80.

(List continued on next page.)

Primary Examiner—Andrew W. Johns
Assistant Examiner—Seye D. Azarian
(74) Attorney, Agent, or Firm—Gates & Cooper LLP (57) ABSTRACT

A method, apparatus, article of manufacture, and a memory structure for generating a sequence of character strings is disclosed. This is accomplished by making multiple consecutive variations of a single character-string pattern where each variation differs from the previous one in a systematic way. The pattern is not restricted in form or in content, and the variations can include adding, deleting, and modifying lines and strings in the pattern, and making no change. This is implemented by executing production rules on a template.

In one embodiment, the method herein described begins by defining a template comprising a plurality of template character strings, and defining an ordered series of production rules, each with a comparison field, an operator, and a substitution field comprising a list of elements defining an initial value and a current value. The current value of each production rule is set to the initial value, and the production rules are applied to the template one at a time in execution order. The result of this application of production rules to the template is then enumerated. Finally, the production rules are then iterated in accordance with the operator and substitution field, and again applied to the template.

32 Claims, 10 Drawing Sheets

OTHER PUBLICATIONS

Covington, W.O., Jr. et al., "A Test Data Synthesizer for Telephone Company Accounting Office Processing of Call Data," Software–Practice and Experience, vol. 12, 1982, pp. 505–516.

Duncan, A.G. et al., "Using Attributed Grammars to Test Designs and Implementations," IEEE, 1981, pp. 170–177.

Figueira, C. et al., "Benchmarks Specification and Generation for Performance Estimation on MIMD Machines," Proceedings of the IFIP WG10.3 Working Conference on Applications in Parallel and Distributed Computing, 1994, 215–223.

Houchard, J.H., "Conceptual Design of Test Aides for Flight Critical Control Systems," IEEE, Proceedings of the National Aerospace and Electronics Conference (NAECON '94), vol. 2, Dayton, Ohio, 1994, pp. 911–918.

Parrish, A.S. et al., "Automated Flow Graph–Based Testing of Object–Oriented Software Modules," Journal of Systems and Software, 1993, vol. 23, pp. 95–109.

Purdom, P., "A Sentence Generator for Testing Parsers," BIT 12, 1972, pp. 366–375.

Sailor, D., "Increasing the Performance of Test Programs Produced by Automated Test Program Generators," Test Engineering Conference Proceedings, Atlanta, Georgia, Jun. 24–27, 1991, SI 6.1, pp. 441–446.

Schwartz, S.R. et al., "Automated Parameter Tuning in Stereo Vision under Time Constraints," Proceedings of the 1992 IEEE International Conference on Tools with AI, Arlington, VA, Nov. 1992, pp. 162–169.

von Mayrhauser, A. et al., "Domain Based Testing: Increasing Test Case Reuse," Proceedings of the 1994 IEEE International Conference on Computer Design: VLSI in Computers and Processors, Cambridge, MA, Oct. 10–12, 1994, pp. 484–491.

* cited by examiner

```
        204E  204F  204I
204A  204B  [c] [c] [d] [d] [e] [e]
[a] [a] [b] [b]            204H
   204C   204D  204G
                                    }  202
                                    204J where:

[a]   = a | b | c            iterate-in-turn rule      ─── 206A
[b]   = d | e                iterate-in-turn rule      ─── 206B
[c]   . = 11 to 20           associated rule           ─── 206C
[d]   .. = 21 to 30          iterate-every-time rule   ─── 206D
[e]   ... = 31 to 40         iterate-every-usage rule  ─── 206E results in:

| abc | a\bc | a\\bc |
|---|---|---|
| where:<br><br>a = aba<br>a = b<br>b = b<br>bb = c<br>cc = ab | where:<br><br>a = aba<br>a = b<br>b = b<br>bb = c<br>cc = ab | where:<br><br>a = aba<br>a = b<br>b = b<br>bb = c<br>cc = ab |
| results in:<br><br>abc | results in:<br><br>cbbc | results in:<br><br>cb\bc |

*FIG. 9*

| level 1 to level 0 | level 2 to level 1 | level 3 to level 2 |
|---|---|---|
| abc<br><br>where:<br><br>a = aba<br>a = b<br>b = b<br>bb = c<br>cc = ab | \abc<br><br>\where:<br><br>rules<br><br>where:<br>rules = \a  \= aba<br>          \a  \= b<br>          \b  \= b<br>          \bb \= c<br>          \cc \= ab | \\\abc<br><br>\\\where:<br><br>\rules<br><br>\where:<br><br>\rules \= \\\a  \\\= aba<br>            \\\a  \\\= b<br>            \\\b  \\\= b<br>            \\\bb \\\= c<br>            \\\cc \\\= ab<br>where:<br><br>x = y |
| results in:<br>abc | results in:<br>abc<br><br>where:<br><br>a = aba<br>a = b<br>b = b<br>bb = c<br>cc = ab | results in:<br>\abc<br><br>\where:<br><br>rules<br><br>where:<br>rules = \a    \= aba<br>          \a    \= b<br>          \b    \= b<br>          \bb  \= c<br>          \cc  \= ab |

*FIG. 10*

SYSTEMATIC ENUMERATING OF STRINGS USING PATTERNS AND RULES

BACKGROUND OF THE INVENTION

1. Field of the Invention

The present invention relates to systems and methods of generating a series of character strings, and in particular to a method and system for systematically generating a series of character strings from the systematic application of a rule set to a template.

2. Description of the Related Art

Frequently, in testing computer software products, the need arises to create many ordered sequences of character strings; each based on a specified theme. Such ordered sequences can be used in a program to test the operation of functional attributes in the software product. The desired sequences are variations of the sequence theme, which are unique in specific, non-random, and non-trivial ways and are produced according to a first-to-last ordering. Manually producing such sequences can be extremely time-consuming.

Manually producing such sequences is a time-consuming and error-prone process. Automated test case generators have been developed which reduce the time to create test case sequences and reduce the chances of error. These automated test case generators include random test case generators and rule-based test case generators.

Random test case generators can be effective, but are limited in usefulness. Random generators do not allow control over the order in which the test cases are generated, nor do they allow control over the specific contents of each test case.

Rule-based test case generators have similar limitations. Many rule-based generators will produce only a specific type of test case (for example, program generators typically do not generate data I/O data records). Other rule-based test case generators can generate test cases only in a specific programming language. Current rule-based generation systems are deficient in one or more of the following ways: template specification (many do not provide for the specification of a template), allowing non-terminal strings to be produced (many do not allow non-terminal strings to be produced where a non-terminal string, if input to the method, would be further transformed), or output strings re-input to the generator (abstraction ability). Abstraction ability is desirable, since it allows for the generation of potentially many templates and rules from a single template and set of rules.

What is needed is a system for efficiently generating a sequence of character stings in a versatile, systematic and predictable way. The present invention satisfies that need.

SUMMARY OF THE INVENTION

To address the requirements described above, the present invention discloses a method, apparatus, article of manufacture, and a memory structure for making multiple consecutive variations of a single character-string template (or pattern) where each variation differs from the previous one in a systematic way. The pattern is not restricted in form or in content, and the variations can include adding, deleting, and modifying lines and strings in the pattern, and making no change. This is implemented by executing production rules on a template.

Production rules specify the substitutions that are to be made in the template. A number of different types of production rules are disclosed, which make complex substitution sequences easy to accomplish.

A template is a set of strings which expresses a theme and into which substitutions are made. It is the pattern which is used in evaluating the output strings. The template simplifies the specification of the production rules, and provides good documentation about the type of result to be produced. Unlike other rule-based generation programs, the template used in the present invention allows the template pattern to be written in any language (including any programming language, even those which have been defined, but not implemented) without restriction.

Another feature of the present invention is that the production rules are executed only once per enumeration (output), and they are executed in a first-to-last sequence (i.e. there is no skipping rules, no random processing, no mandatory continuation of processing until all terminal symbols are produced). Some rule based production systems must continue processing until no rule can be applied (i.e. until all "non-terminal strings" are transformed into "terminal strings").

Patterns for a variety of applications can be generated with the present invention. For example, when the pattern is a computer program (a level 1 pattern), applying the described method results in the automatic generation of programs which are suitable for compiling by a compiler (level 0 patterns). When applied to an option list for a compiler, the method results in the automatic generation of compiler options. Further, when the pattern is a level n meta-pattern (n>1), applying the described method results in an automatic generation of level n-1 patterns.

In one embodiment, the method herein described begins by defining a template comprising a plurality of template character strings, and defining an ordered series of production rules, each with a comparison field, an operator, and a substitution field defining an initial value and a current value. The current value of each production rule is set to the initial value, and the production rules are applied to the template one at a time in execution order. The result of this application of production rules to the template is then enumerated (output). Finally, the production rules are then iterated (i.e. updated in accordance with the operator and substitution field) and again applied to the template.

In an alternative embodiment, the foregoing method steps are represented by a series of instructions recognizable by a computer. These instructions may be embodied in a storage device, or transmitted over a communications network to a local computer. Another alternative embodiment comprises a means for defining a template with a plurality of character strings, means for defining an ordered series of production rules having the characteristics described above, means for setting the current value of each production rule to the initial value, means for applying each of the production rules in order to the template, and a means for iterating the production rules after each of the production rules have been applied.

The foregoing method, apparatus, article of manufacture and memory structure result in a number of significant improvement over current pattern generators in the following areas:

Productivity: productivity is increased because the present invention allows a few lines written in the enumeration language to produce many lines of output.

Thoroughness: Because it permits the user to more easily generate a large number of enumerations, the present invention encourages the software developer to perform more comprehensive and thorough testing.

Knowledge Organization: The template and rule set used by the present invention is an "encapsulation" of a set of enumerations, where each enumeration in the set is created in deterministic order. Creating this encapsulation requires understanding of the characteristics of the enumerations and the changes that occurs with them.

Abstraction: The disclosed template and rule set can produce strings that are templates and sets of rules (which can then be input into the procedure). This is meaningful when the target set of strings has been encapsulated into a set of templates and rules (set "A", for example), and then set A is encapsulated into a template and rules.

Systematic coverage: The application of rules to the template results in a deterministic output, so the enumerations are produced in a predictable manner. This also allows the nth enumeration from a set of rules to be enumerated for special treatment or study.

Accuracy: Systematic enumeration avoids the mistakes of by-hand enumeration.

Ease of Maintenance: If modification of the enumerations is required, it can be easily accomplished by re-enumerating a modified template and/or rules, thus saving writing special processing code or performing modifications by hand.

Compact Form: The enumerations can be discarded after use, and re-generated as needed.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The procedure to systematically generating a number of character strings can be expressed in simple terms as making "copies" of a pattern (or "template") where each "copy" is systematically different from the previous one in non-trivial ways. The method disclosed herein is to encode the variation in production rules and to define a procedure which produces variations by systematically transforming a priori specified character string pattern according to the rules specification. An ordered sequence of one or more production rules identifies the variations. For notational convenience, the character string is called a "template" and the result produced by a single execution of the rules is called an "enumeration."

Hardware Environment

Figure 1:
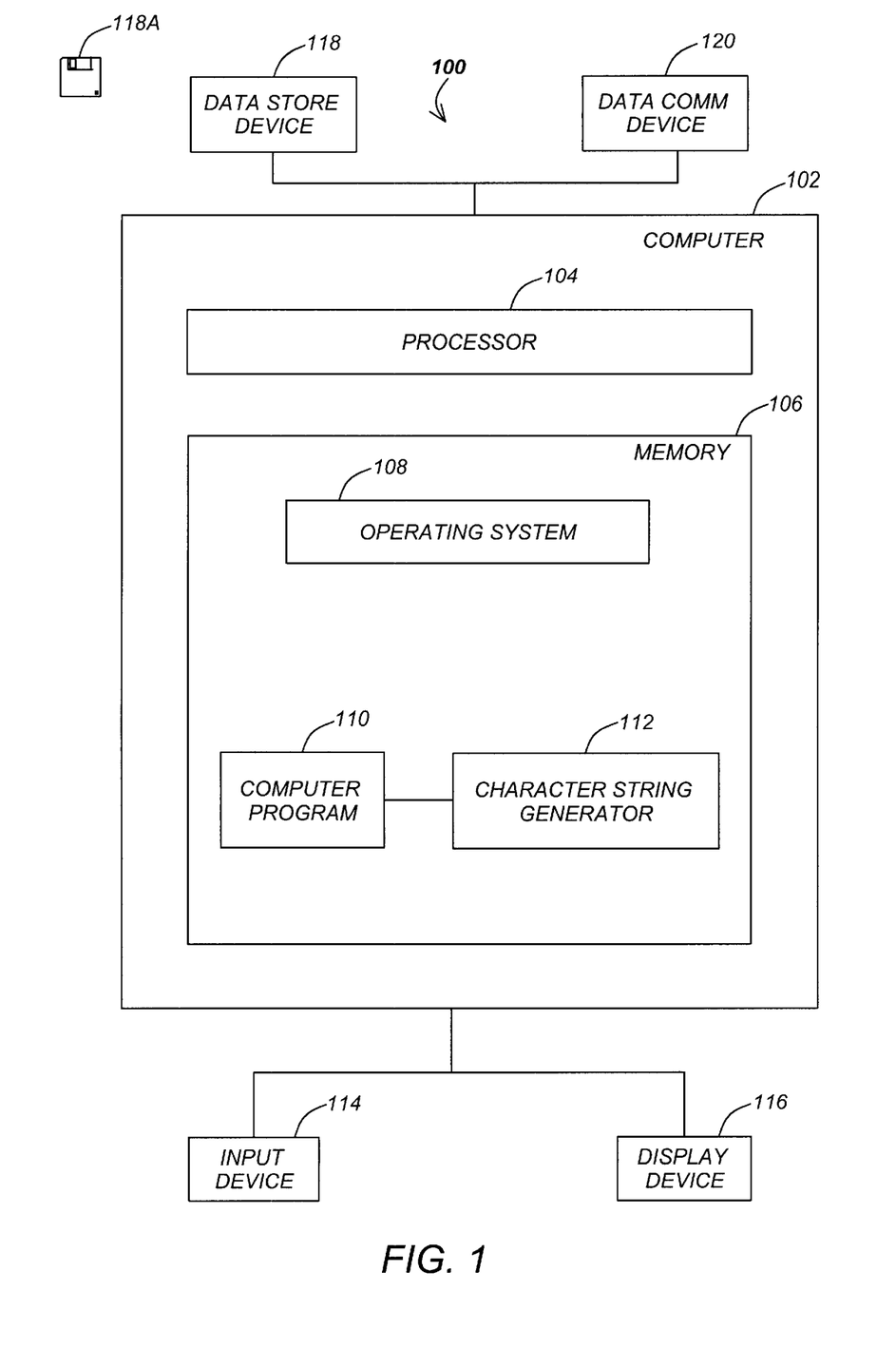
FIG. 1 is a block diagram showing an exemplary hardware environment for practicing the present invention.

FIG. 1 illustrates an exemplary computer system 100 that could be used to implement the present invention. The computer 102 comprises a processor 104 and a memory 106, such as random access memory (RAM). The computer 102 is operatively coupled to a display device 116, which presents images such as windows to the user on a graphical user interface. The computer 102 is also coupled to one or more input devices 114, such as a keyboard, a mouse device. Also, the computer 102 may be coupled to a printer or other output peripheral device. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through an interface. In one embodiment, the interface is a graphical user interface (GUI). Although the GUI module 118A is depicted as a separate module, the instructions performing the GUI functions can be resident or distributed in the operating system 108, the application program 110, or implemented with special purpose memory and processors. The memory 106 also comprises a computer program 110 and character string generator 112.

In one embodiment, instructions implementing the operating system 108, the computer program 110, and/or the character string generator 112 are tangibly embodied in a computer-readable medium, e.g., data storage device 118, which could include one or more fixed or removable data storage devices, such as a zip drive, floppy disc drive 118A, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices 120, thereby making a computer program product or article of manufacture according to the invention. As such, the terms "article of manufacture" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Templates and Production Rules

Figure 2:
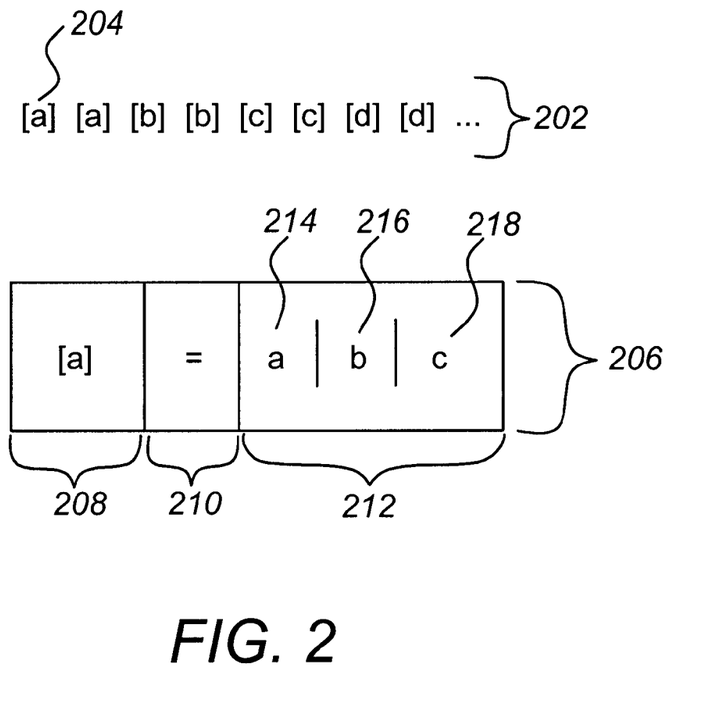
FIG. 2 is a diagram illustrating production rule and template structure.

FIG. 2 is a diagram showing an exemplary embodiment of a template 202 and a production rule 206 used to practice the present invention. The template comprises one or more character strings 204. Although the exemplary embodiment shows the characters "[a]" to represent the character string 204, the character string may generally comprise any number of characters.

The production rule 206 comprises a comparison field 208, an operator 210, and a substitution field 212. The contents of the comparison field 208 and the substitution field 212 are not limited to fixed character length values, hence the comparison field 208 and the substitution field 212 will hereinafter be alternatively referred to as the lhs (left hand side) and the rhs (right hand side) of the production rule, respectively.

The rhs specifies an ordered list of strings (each of which is called an element) that are to be placed in the template. The comparison field 208 (or lhs) of the production rule 206 specifies the character string that is to be compared to the strings in the template 202. When this comparison results in a match, the current value (one of the rhs elements) of the rule's substitution field 212 (or rhs) is placed in the template in place of the lhs string. The substitution scheme is indicated by the arrangement and selection of characters in the substitution field 212. Hence, rhs elements can expressed as a enumerated list (e.g. "a|b|c,") or as a numerical expression indicating an initial value, increment, and a termination value (e.g. 1 to 100 by 2).

In the illustrated embodiment, the substitution field 212 comprises a series of enumerated elements indicating that the value to be substituted in the template 202 will be an initial element 214 ("a"), then "b", then finally terminal element 218 "c." An example of substitution field 212 with a numerical expression is one in which the substitution field 212 comprises characters defining substitution elements that are incrementally determined (i.e. begin at character "a" (some numeric value), increment character "a" by an incremental value "b" (some numeric value), until a terminal value "c" is reached). A simple example of an enumerated list production rule is "x=bcd," which indicates that the string "x" in the template is to be replaced with the string "bcd." Further, there is no repeated substitution of strings in the template that have been placed there by the rule that is operating (backtracking). With a backtracking system, given a template consisting of "zz" and the single rule z=zz, the result would be zzzzz . . . (conceptually never terminating). As defined in this disclosure, the result would be zzzz (the first "z" in the template is replaced with the string "zz", then the second of the original two "z" s in the template is replaced with the string "zz").

The following concepts are associated with each production rule:

Initial Value—the first element specified in the rhs list
Current Value—the value to be placed in the template
Increment—in a numerical expression rhs, the "by" clause value; in an enumerated element list, the increment is one
Next Value—the value after the current value. In an enumerated expression rhs, the next value is computed by adding the increment to the current value; in an enumerated list rhs, the next value is the next element in the rhs list
Termination Value—in a numerical expression rhs, the "to" clause value; in an enumerated list rhs, the termination value is the last element.

Table 1 below shows an exemplary list of operators, each of which identifies (1) either a string replacement or a word replacement; (2) the rule type, which indicates how often the rule is to be iterated. A string replacement rule specifies that all strings in the template that match the rule's lhs string are to be replaced (by the appropriate string in the rhs).

TABLE 1

| Rule Type | String Replacement | Word Replacement |
| --- | --- | --- |
| iterate-in-turn | = | =. |
| associated | .= | .=. |
| iterate-every-time | ..= | ..=. |
| iterate-every-usage | ...= | ...=. |

A word is a blank-delimited string of characters, all of which are non-blank. A string is a sequence of any characters (including blanks). The null string contains no characters.

A word replacement rule specifies that all words in the template that match the rule's lhs word are to be replaced (by the appropriate string in the rhs). In this context, the term "iterate" means that the next value of the rule is computed and made the rule's current value.

A single non-blank character preceded by "\" (backslash or escape character) is not recognized as that character. For example, "\=" is not recognized as an equal sign, and \\ is not recognized as an escape character. This means that a rule with lhs "x" does not match any string in the template "\x \\\x" but does have two matches in the string "x \\\\x." The lhs of each rule is processed according to the algorithm specified in FIG. 7 before comparing with the strings in the template 202. Thus, for example, the user-specified lhs "x \=a" becomes the lhs "x=a."

Summary

Rules are executed in sequential order in either a top-down (from the first rule to the last) or bottom-up (from the last rule to the first). Hence, in the discussion of the algorithms below, terms referring to the sequence of rules (such as "first," "last," "subsequent," and "preceding") refer to the execution order, not necessarily the order in which they occur. Rules are organized into one or more "rule groups," which are executed from the first to the last. For each rule group, the following algorithm applies.

The first iterate-in-turn production rule is iterated in every enumeration. Each subsequent iterate-in-turn rule is iterated only after all the elements of the immediately preceding iterate-in-turn rule have been iterated. An associated production rule (which is iterated only when the production rule that immediately precedes it is iterated) is then iterated. For this reason, the first rule in any ordered sequence of production rules cannot be an associated rule. An iterate-every-time rule is iterated on every enumeration. An iterate-every-usage rule is iterated each time that the rule's rhs is placed in the template. Associated rules, iterate-every-time rules, and iterate-every-usage rules are the mechanism that make multiple string replacements in the template per enumeration possible.

Detailed Description

Figure 3:
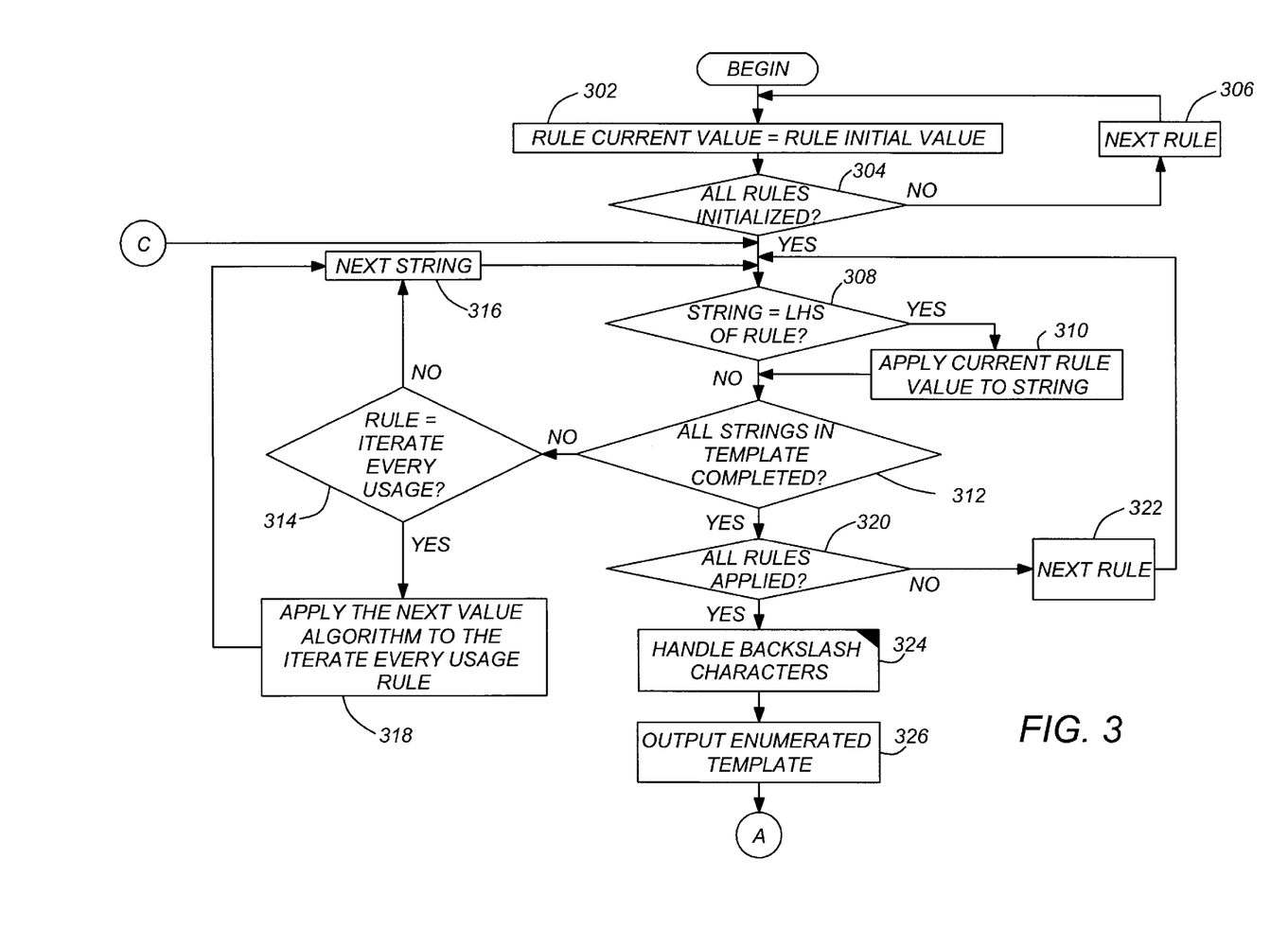
FIG. 3 is a flow chart presenting an illustrative example of a portion of the process steps used in generating a sequence of character strings.

FIG. 3 is a flow chart showing the operations used to practice one embodiment of the present invention. First, a template 202 and a series of production rules 206 are defined. The template 202 comprises one or more character strings 204. Next, the production rules are initialized by setting the current value of each production rule 206 to the production rule's initial value 214. This is depicted in blocks 302–306. A test is then performed to determine if the characters in the lhs (those in the substitution field 208) of the current production rule 206 match character string in the template 202. When there is a match, the current value of the production rule is applied to the template character string. This is depicted in blocks 308–310. Block 312 checks to see if all character strings in the template have been compared to the current rule. If not, the next character of the template 202 is compared to the rhs 208 of production rule 206. In cases where the production rule 206 is an "iterate-every-usage" rule, a next value algorithm (which is described later in this disclosure) is applied before the lhs of the production rule is compared to the next template character string. This allows the employment of a production rule that iterates its value every time a production rule is applied to the template. The foregoing logic is depicted in blocks 314–318.

Next, block 320 determines whether all of the production rules have been applied. If not, the logic of blocks 308–312 is repeated for the next production rule 206. Block 324 performs backslash character processing, and the template (with the values from the substitution field 212 applied) is enumerated, or output, as depicted in block 326.

Figure 4:
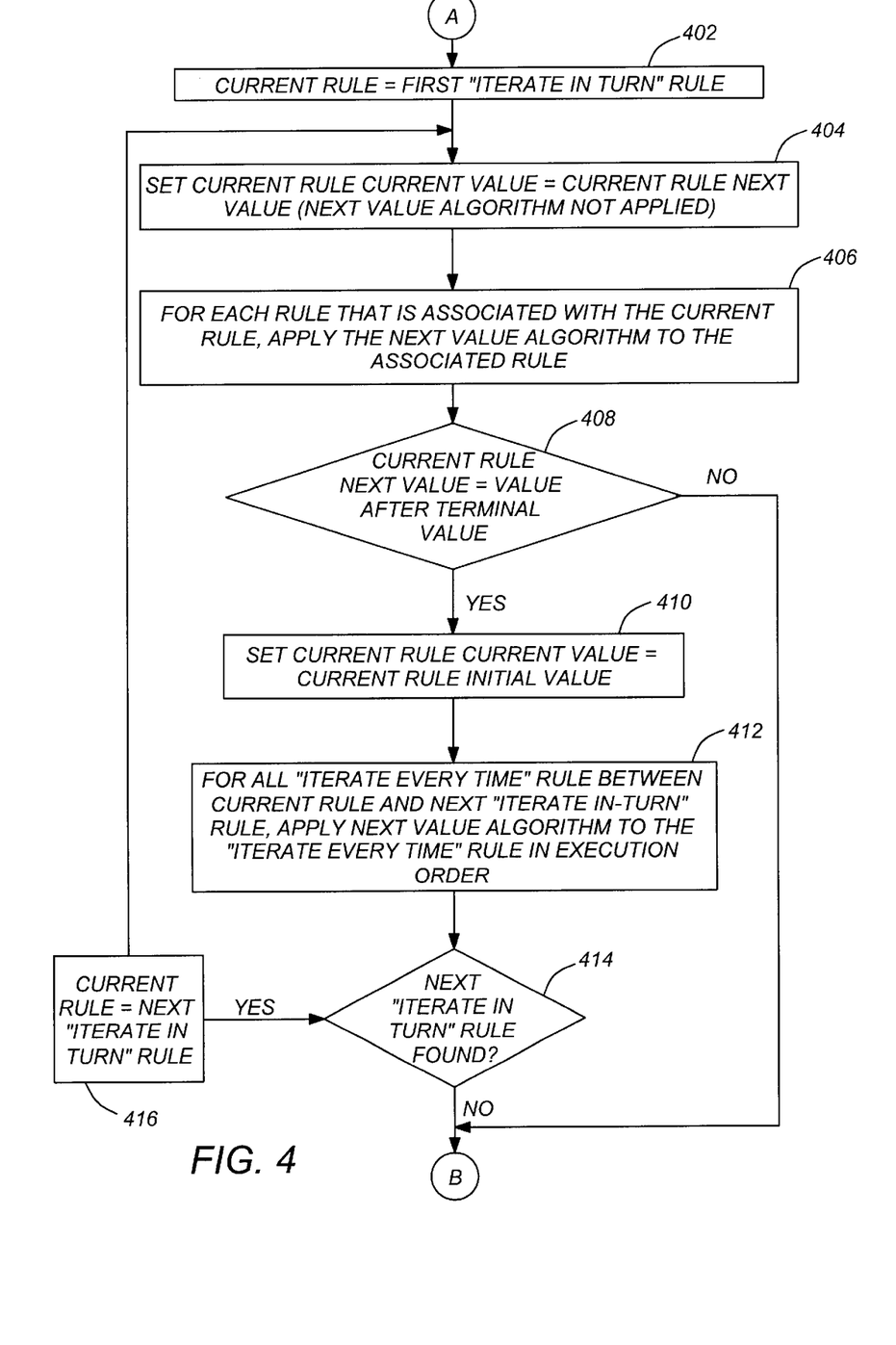
FIG. 4 is a flow chart presenting an illustrative example of additional process steps used to generate a sequence of character strings.

FIG. 4 is a flow chart further illustrating the process steps employed by the character generator 112. First, the first iterate-in-turn rule is set to the current rule, as shown in block 402. Next, the current rule is iterated (the current value of the current rule is set to the next value of the current rule). This is depicted in block 404. Then, the next value algorithm shown in FIG. 6 is applied to each rule that is associated with the current rule (these rules are "associated" with the current rule by virtue of their operator type and location immediately behind the current rule in the execution order), as shown in block 406.

If the next value of the current rule is not a value after the terminal value for the current rule, processing is routed to after block 414. If the next value of the current rule is a value after the terminal value of the current rule, the current value of the current rule is set to the current rule initial value, and the next value algorithm is applied to all iterate-every-time rules between the current rule and the next iterate-in-turn rule, in execution order. This is depicted in blocks 408-410. If there is another iterate-in-turn rule in the execution order, the current rule is set to that iterate-in-turn rule, and processing returns to block 404. If there are no further iterate-in-turn rules in the execution order, processing continues.

Figure 5:
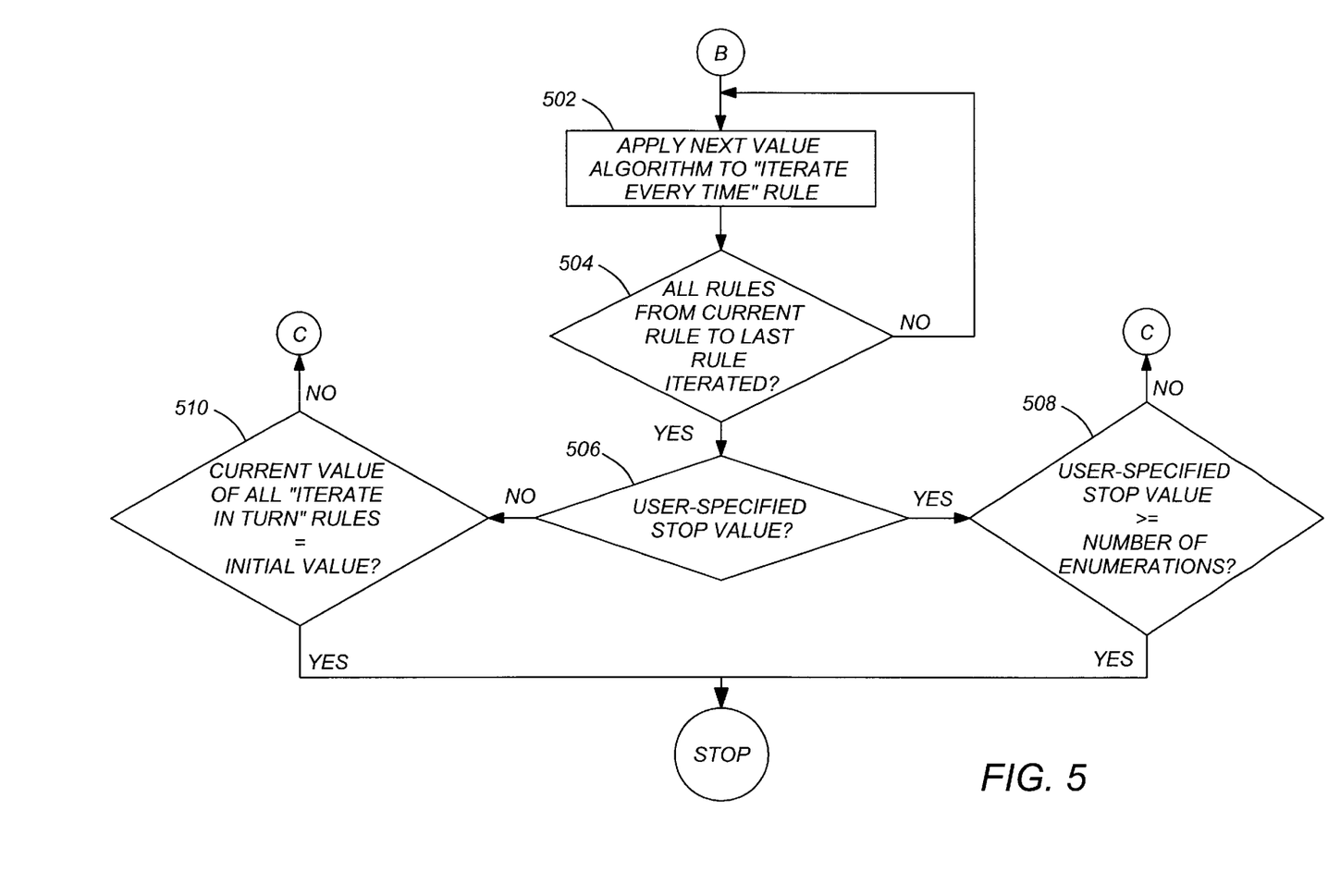
FIG. 5 is a flow chart presenting an illustrative example of further process steps used in generating a sequence of character strings.

FIG. 5 is a flow chart further illustrating the process steps employed by the character string generator 112. First, the next value algorithm is applied to the iterate-every time rules. This is repeated until all rules from the current rule to the last rule have been iterated, as shown in blocks 502 and 504. Processing may be halted in at least two ways. In some cases, it is desirable to produce a specific number of character strings for test cases. In such situations, the processing will cease when the user-specified number or enumerations is reached. This is implemented in blocks 506 and 508. In other cases, the user may desire the character sequence generator 112 to continue until all enumerations indicated by the production rules has completed. This will be the case when the current value in all iterate-in-turn rules are again set to the initial value (since all are reset to the initial value after the terminal value is passed). This logic is implemented by blocks 506 and 510. If either termination condition is not met, processing returns to block 308 of FIG. 3.

Figure 6:
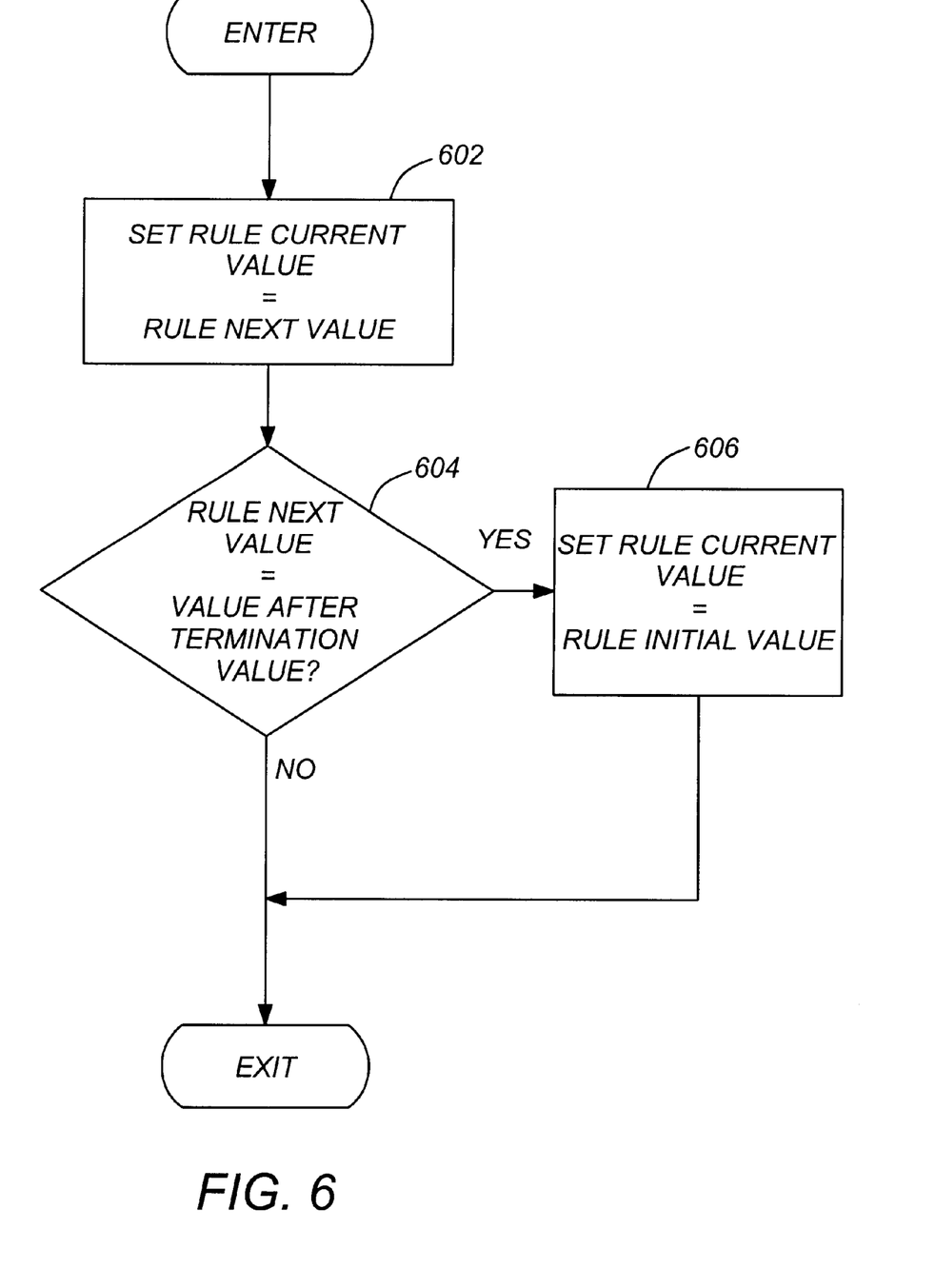
FIG. 6 is a flow chart illustrating the process steps used in applying the next value algorithm.

FIG. 6 is a flow chart of the next value algorithm. First, the rule current value is set to the rule next value, as shown in block 602. Then, if the rule next value is after the rules termination value, the rule's current value is set to the rule initial value. This is depicted in blocks 604 and 606.

Figure 7:
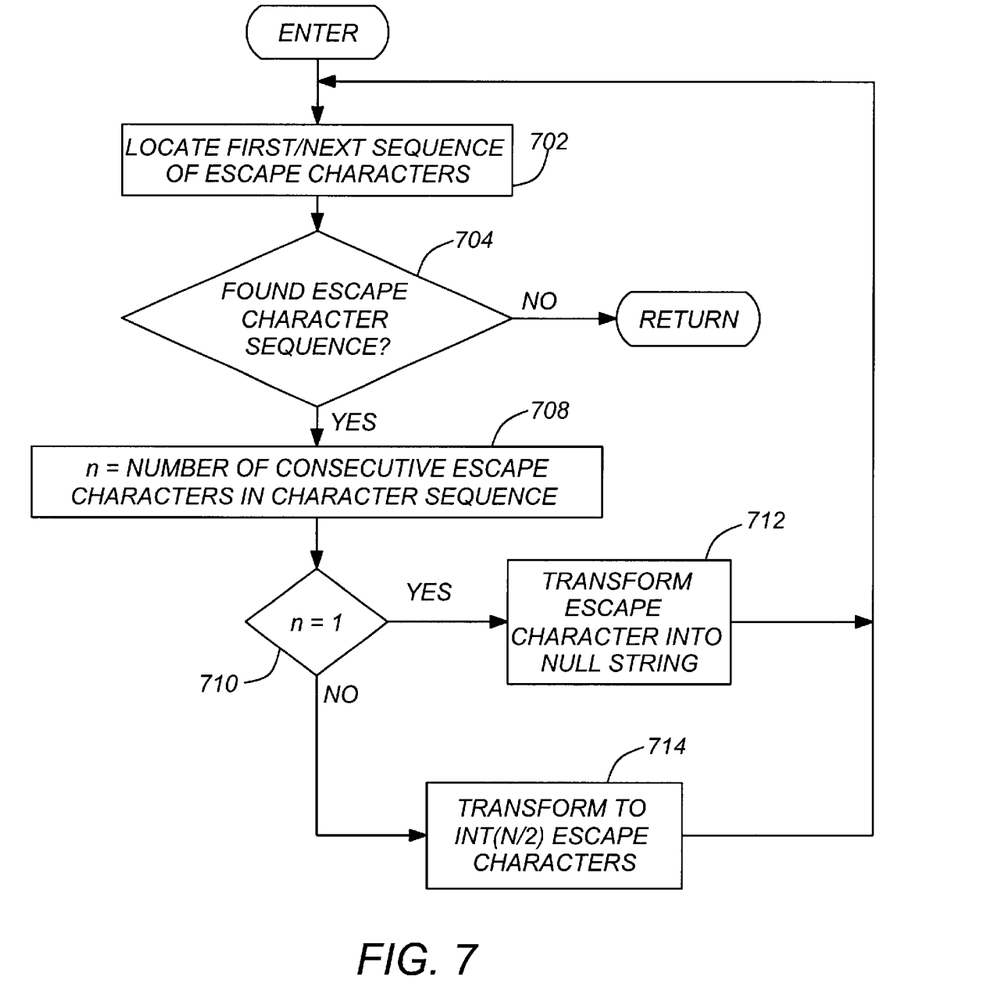
FIG. 7 is a flow chart illustrating the backslash character processing.

FIG. 7 is a flow chart depicting the backslash processing referred to in block 324 of FIG. 3. First, the first sequence of escape characters in the enumeration (output) is identified as shown in block 702. If there are no escape character sequences, processing returns to block 326. This is shown in blocks 704–706. The number of escape characters is then determined as shown in block 708. If the escape character sequence contains only one escape character, it (the escape character) is transformed to a null string and processing returns to block 702. Otherwise, the escape character string is transformed into an escape character string with INT[n/2] escape characters (where INT means truncate to integer) and processing returns to block 702. This is shown in blocks 710–714.

Figure 8:
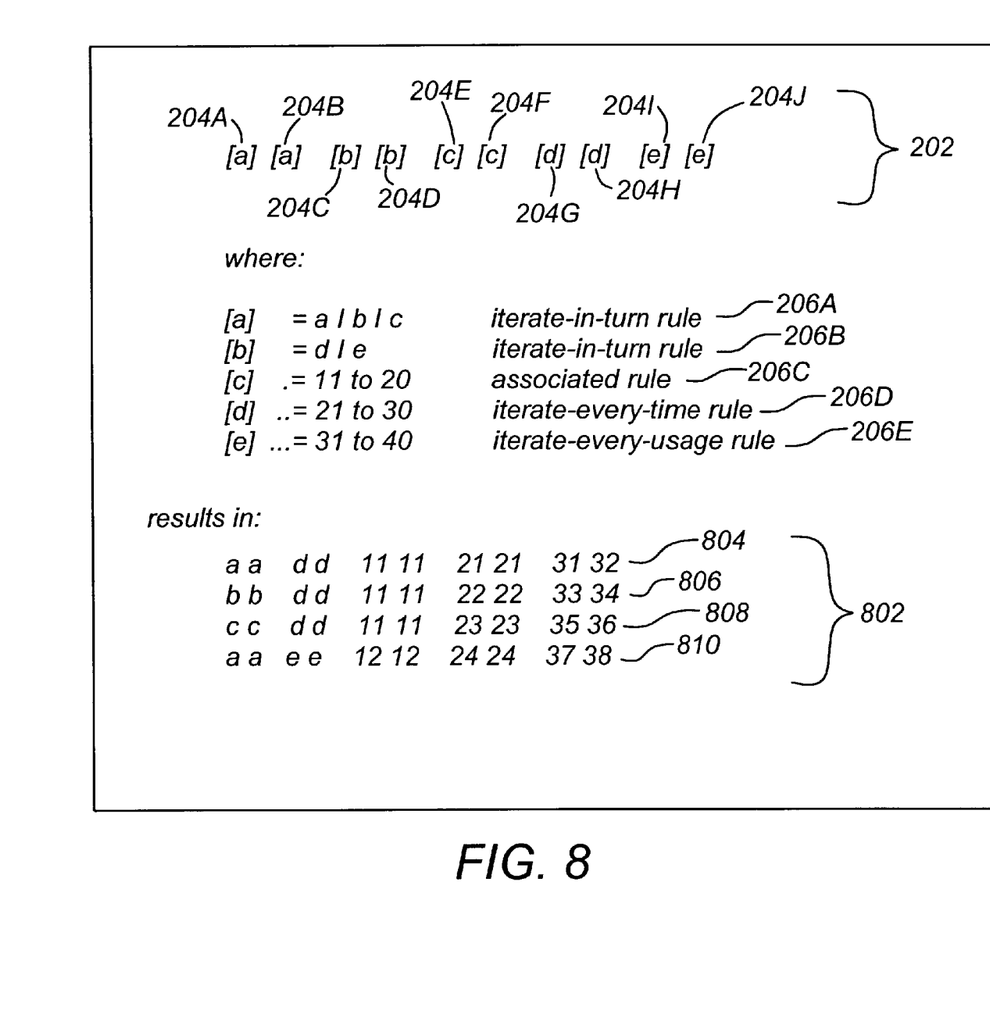
FIG. 8 is a chart of the template, production rules, and result of an exemplary procedure execution.

FIG. 8 presents a simple example of how multiple consecutive enumerations 802 can be created with a simple character string template 202 and five production rules 206A–206E. The first four enumerations 804–810 are produced by a top-down execution of the production rules (206A–206E). In this example, a user-specified stop-at value was set to four, and hence only four enumerations are created.

Further Alternative Embodiments

The present invention can be advantageously applied in the production of self-checking and randomly produced test cases. Self-checking test cases can be produced by constructing rules so that functional equivalent test cases are produced (from the computational result perspective). Thus, only one unique answer is produced for a suite of test cases (assuming correctness in the enumerations and in the tested system). This one answer can be easily verified by other methods. The result from running each enumeration is compared to the previous result (or the verified result) and any difference means that an error has occurred.

Random value test cases can be performed by using start-at and stop-at values to produce enumerations. For example, if the start-at value is one and the stop-at value is ten, the first ten enumerations are produced. Random test cases can be generated by a procedure which randomly selects start-at and stop-at values.

Other character string sequence generation techniques can also be implemented with the foregoing teaching. One can place a value in a template that another rule can change, or two rules can place strings in a template that can then be recognized as the lhs string by another rule. Even in this case, infinite recursion will not occur, since the rule-execution procedure is sequential and unidirectional. The use of the escape or backslash character allows level n templates (n>1) to be created.

Figure 9:
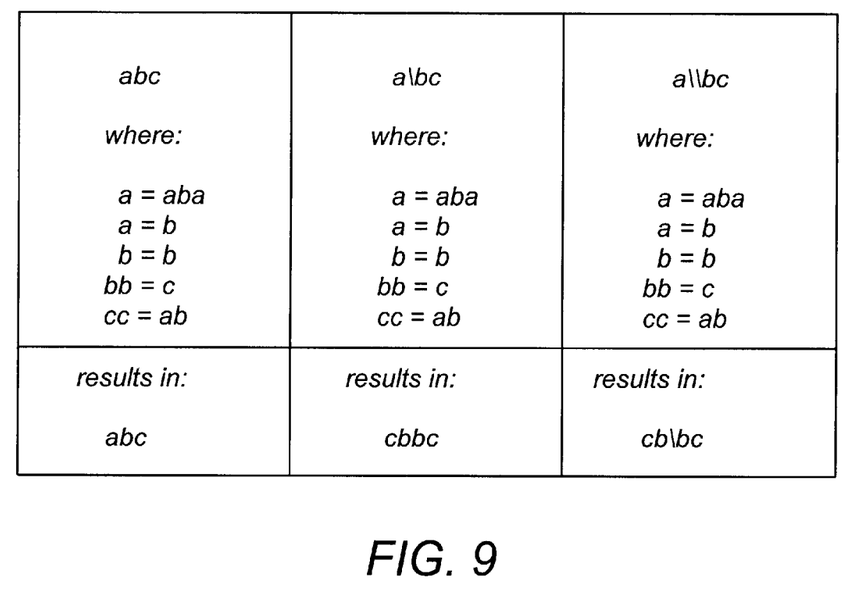
FIG. 9 is a chart providing examples of the template, production rules, and procedure execution results for an alternative embodiment.

FIG. 9 presents a table showing the application of another embodiment of the present invention. In the first example shown in FIG. 9, the template is "abc" and the production rules are those statements following the "where:" statement. Application of the first production rule "a=aba" results in the following: "ababc." Application of the second production rule "a=b" results in: "bbbbc." Application of the third production rule "b=b" has no effect. Application of the next production rule "bb=c" results in "ccc." Finally, applying the last production rule "cc=ab" results in the enumeration (output) "abc", which is the same as the original template.

In the next example shown in FIG. 9, the template is "a\bc," and the same production rules are applied in the same execution order. The result of applying the production rules to the template in execution order is the following: "aba\bc," "bbb\bc," "bbb\bc," "cb\bc," and "cb\bc," and the first enumeration (output) template (since single backslash characters are set to null) is "cbbc." The final example of FIG. 9 shows the same processing, except that since there are two backslash characters, only one is removed, and the result is "cb\bc."

Figure 10:
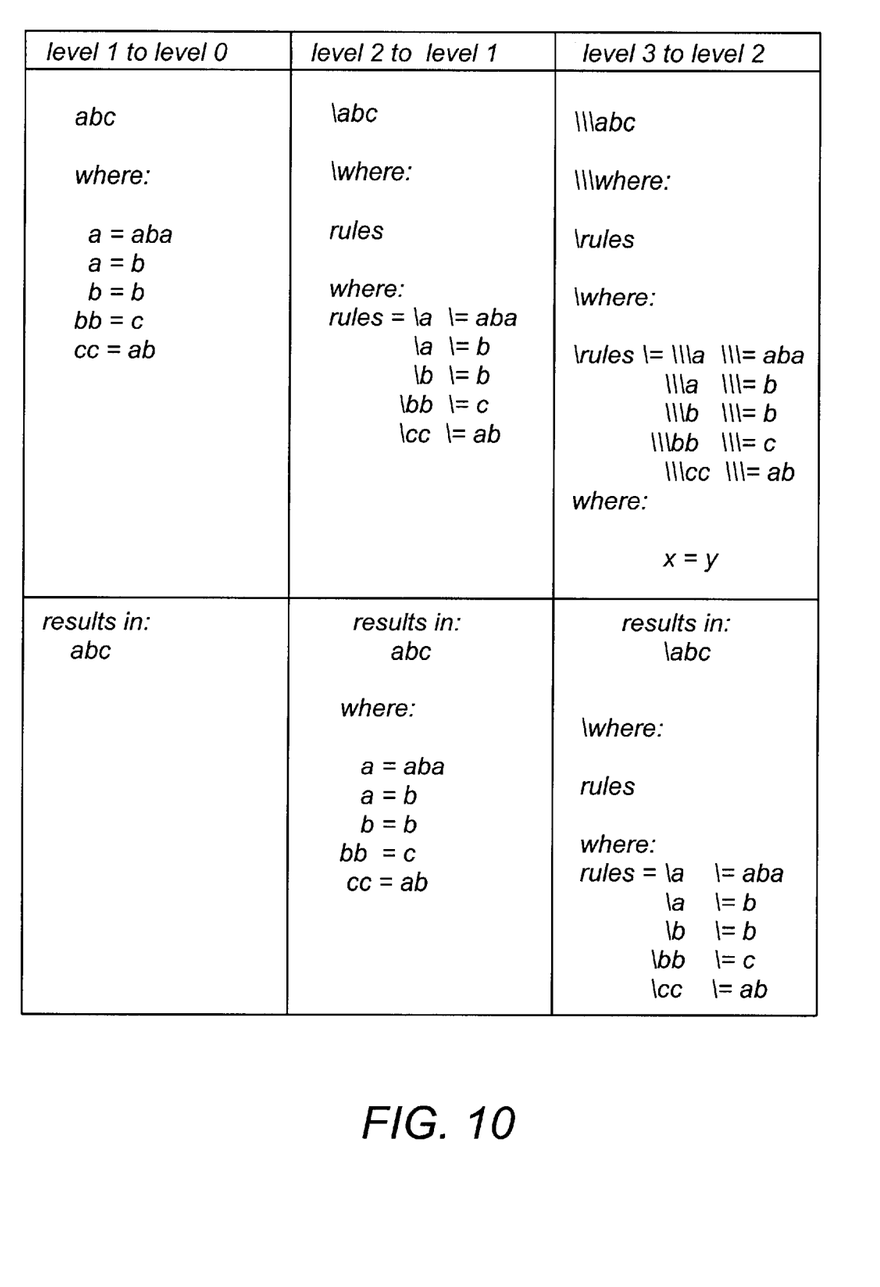
FIG. 10 is a chart providing additional examples of the template, production rules, and procedure execution results for an alternative embodiment.

FIG. 10 presents a table showing examples of producing meta-pattern examples using the template, production rules, and escape characters. In this Figure, the top half shows a template with rules and the bottom half shows the result when applying the rules to the template. Starting with the "Level 3 to Level 2" column, we see that the template consists of everything down to the "where:" and that there is a single rule (i.e., "x=y"). In applying the rules we see that there is no "x" in the template so there is no substitution to be made. A single pass of the rules has been completed. The template escape characters are transformed according to FIG. 7 and the template is output. The result is shown on the bottom of FIG. 10 in the "Level 3 to Level 2" column.

The "Level 2 to Level 1" column shows the output of the "Level 3 to Level 2" column but it is now viewed as a template and single rule (rules=\a . . . ). We see that the template contains the string "rules" which matches the rule lhs so a substitution is made, the escape characters are transformed according to FIG. 7 and the template is output (the bottom of FIG. 10 in the "Level 2 to Level 1" column.) This result is then used as the template and rules shown in the top of the "Level 1 to Level 0" column. When the rules in this column are applied, the template becomes, in turn, "ababc", "bbbbc", "bbbbc", "ccc", "abc". Thus the template value that is output is "abc", (i.e., the value of the template after the last rule is applied).

Conclusion

This concludes the description of the preferred embodiments of the present invention. In summary, the present invention describes a method, apparatus, and article of manufacture for generating a sequence of character strings. The method herein described begins by defining a template comprising a plurality of template character strings, and defining an ordered series of rule groups, each comprising an ordered series of production rules wherein each production rule has a comparison field, an operator, and a substitution field comprising a list of elements and defining an initial value and a current value. The current value of each production rule is set to the initial value, and the production rules are applied to the template one at a time in execution order. The result of this application of production rules to the template is then enumerated (that is, the template, as modified by the application of the rules, is output). Finally, the production rules are then iterated in accordance with the operator and substitution field, and again applied to the template.

In an alternative embodiment, the foregoing method steps may be represented by a series of instructions recognizable by a computer. These instructions may be embodied in a storage device, or transmitted over a communications network to a local computer. Another alternative embodiment comprises a means for defining a template with a plurality of character strings, means for defining an ordered series of production rules having the characteristics described above, means for setting the current value of each production rule to the initial value, means for applying each of the production rules in order to the template, and a means for iterating the production template after each all of the production rules have been applied.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of generating a sequence of character strings, comprising the steps of:
   (a) defining a template comprising a plurality of template character strings;
   (b) defining an ordered series of production rules, each production rule comprising a comparison field, an operator, and a substitution field comprising a list of elements and defining an initial value and a current value;
   (c) setting the current value of each production rule to the initial value;
   (d) applying a production rule to the template by applying the production rule current value to the template characters when the production rule comparison field matches the template character string;
   (e) repeating step (d), applying each production rule in order until each production rule has been applied to the template; and
   (f) enumerating the template.

2. The method of claim 1, wherein the method further comprises the steps of:
   (g) iterating the production rules in accordance with the operator and the substitution fields; and
   repeating steps (d) through (g) until a terminating condition on at least one of the production rules is satisfied.

3. The method of claim 2, wherein the terminal condition is satisfied when a number of template enumerations exceeds a stop value.

4. The method of claim 2, wherein:
   the production rules are selected from a group comprising an iterate-in-turn production rule; and
   the step of iterating the production rules comprises the step of setting the current value for the iterate-in-turn production rule to a next value of the iterate-in-turn production rule each time the template is enumerated and any preceding iterate-in-turn production rule of the ordered series of production rules has completed iteration.

5. The method of claim 4, wherein the substitution field of the iterate-in-turn production rule comprises a terminal value, and the terminating condition is satisfied when the current value exceeds the terminal value.

6. The method of claim 4, wherein:
   the production rules are selected from a group further comprising an iterate-every-usage production rule; and
   the step of applying the production rule to the template further comprises the step of iterating the iterate-every-usage production rule by setting the current value of the iterate-every-usage production rule to a next value of the iterate-every-usage production rule.

7. The method of claim 1, wherein:

the production rules are selected from a group further comprising an associated production rule; and the step of iterating the production rules comprises the step of setting the current value for the associated production rule to the next value for the associated production rule each time a production rule immediately preceding the associated production rule in the ordered series of production rules is iterated.

8. The method of claim 1, wherein:

the production rules are selected from a group further comprising an iterate every-time production rule; and the step of iterating the production rules comprises the step of setting the current value for the iterate-every-time production rule to the next value for the iterate-every-time production rule each time the template is enumerated.

9. The method of claim 1, wherein the production rule is applied to the template by replacing the template character strings with the production rule current value when the production rule comparison field matches the template character string.

10. The method of claim 1, wherein the production rules are organized into a plurality of rule groups, and step (e) comprises the steps of:

(e1) repeating step (d), applying the production rules of a rule group in order until each production rule in the rule group has been applied to the template; and (e2) repeating step (e1) above for each rule group in order until the production rules of each rule group has been applied to the template.

11. An apparatus for generating a sequence of character strings, comprising: means for defining a template comprising a plurality of template character strings;

means for defining an ordered series of production rules, each production rule comprising a comparison field, an operator, and a substitution field comprising a list of elements and defining an initial value and a current value;

means for setting the current value of each production rule to the initial value;

means for applying the production rule to the template by applying the production rule current value to the template characters when the production rule comparison field matches the template character string;

means for applying each production rule in order until each production rule has been applied to the template; and means for enumerating the template.

12. The apparatus of claim 11, further comprising:

means for iterating the production rules in accordance with the operator and the substitution fields; and means for repeatedly applying the production rules to the template and iterating the production rules in accordance with the operator and the substitution fields until a terminating condition on at least one of the production rules is satisfied.

13. The apparatus of claim 12, wherein the terminal condition is satisfied when a number of template enumerations exceeds a stop value.

14. The apparatus of claim 12, wherein:

the production rules are selected from a group comprising an iterate-in-turn production rule; and the means for iterating the production rules comprises means for setting the current value for the iterate-in-turn production rule to a next value of the iterate-in-turn production rule each time the template is enumerated and any preceding iterate-in-turn production rule of the ordered series of production rules has completed iteration.

15. The apparatus of claim 14, wherein the substitution field of the iterate-in-turn production rule comprises a terminal value, and the terminating condition is satisfied when the current value exceeds the terminal value.

16. The apparatus of claim 14, wherein:

the production rules are selected from a group further comprising an iterate-every-usage production rule; and the means for applying the production rule to the template further comprises means for iterating the iterate-every-usage production rule by setting the current value of the iterate-every-usage production rule to a next value of the iterate-every-usage rule.

17. The apparatus of claim 11, wherein:

the production rules are selected from a group further comprising an associated production rule; and the means for iterating the production rules comprises means for setting the current value for the associated production rule to the next value for the associated production rule each time a production rule immediately preceding the associated production rule in the ordered series of production rules is iterated.

18. The apparatus of claim 11, wherein:

the production rules are selected from a group further comprising an iterate every-time production rule; and the means for iterating the production rules comprises means for setting the current value for the iterate-every-time production rule to the next value for the iterate-every-time rule each time the template is enumerated.

19. The apparatus of claim 11, wherein the production rule is applied to the template by replacing the template character strings with the production rule current value when the production rule comparison field matches the template character string.

20. The apparatus of claim 11, wherein the production rules are organized into a plurality of rule groups, the means for applying each production rule in order until each production rule has been applied to the template comprises:

means for applying the production rules of a rule group in order and a group at a time, until each production rule in the rule group and each rule group has been applied to the template.

21. A program storage medium, readable by a computer, embodying one or more instructions executable by the computer to perform method steps of generating a sequence of character strings, the method steps comprising the steps of:

(a) defining a template comprising a plurality of template character strings;

(b) defining an ordered series of production rules, each production rule comprising a comparison field, an operator, and a substitution field defining an initial value and a current value;

(c) setting the current value of each production rule to the initial value;

(d) applying a production rule to the template by applying the production rule current value to the template characters when the production rule comparison field matches the template character string;

(e) repeating step (d), applying each production rule in order until each production rule has been applied to the template; and (f) enumerating the template.

22. The program storage medium of claim 21, wherein the method steps further comprises the method steps of:
(g) iterating the production rules in accordance with the operator and the substitution fields; and
repeating steps (d) through (g) until a terminating condition on at least one of the production rules is satisfied.

23. The program storage medium of claim 22, wherein the terminal condition is satisfied when a number of template enumerations exceeds a stop value.

24. The program storage medium of claim 22, wherein:
the production rules are selected from a group comprising an iterate-in-turn production rule; and
the method step of iterating the production rules comprises the method step of setting the current value for the iterate-in-turn production rule to a next value of the iterate-in-turn production rule each time the template is enumerated and any preceding iterate-in-turn production rule of the ordered series of production rules has completed iteration.

25. The program storage medium of claim 24, wherein the substitution field of the iterate-in-turn production rule comprises a terminal value, and the terminating condition is satisfied when the current value exceeds the terminal value.

26. The program storage medium of claim 24, wherein:
the production rules are selected from a group further comprising an iterate-every-usage production rule; and
the method step of applying the production rule to the template further comprises the method step of iterating the iterate-every-usage production rule by setting the current value of the iterate-every-usage production rule to a next value.

27. The program storage medium of claim 21, wherein:
the production rules are selected from a group further comprising an associated production rule; and
the method step of iterating the production rules comprises the method step of setting the current value for the associated production rule to the next value for the associated production rule each time a production rule immediately preceding the associated production rule in the ordered series of production rules is iterated.

28. The program storage medium of claim 21, wherein:
the production rules are selected from a group further comprising an iterate every-time rule; and
the method step of iterating the production rules comprises the method step of setting the current value for the iterate-every-time production rule to the next value for the iterate-every-time production rule each time the template is enumerated.

29. The program storage medium of claim 21, wherein the production rule is applied to the template by replacing the template character strings with the production rule current value when the production rule comparison field matches the template character string.

30. The program storage device of claim 21, wherein the production rules are organized into a plurality of rule groups, and method step (e) comprises the method steps of:
(e1) repeating step (d), applying the production rules of a rule group in order until each production rule in the rule group has been applied to the template; and
(e2) repeating step (e1) above for each rule group in order until the production rules of each rule group has been applied to the template.

31. A method of generating a sequence of character strings, comprising the steps of:
defining a template comprising a plurality of template character strings;
defining a production rule set comprising an ordered series of production rules, each production rule comprising a comparison field having at least one comparison character and a substitution field having at least one substitution character; and
applying the series of production rules to the template one at a time by applying the substitution character of each production rule to the template when the comparison character of the production rule matches the template character string.

32. A memory for use in generating a sequence of character strings, comprising:
a first memory portion for storing a template comprising a plurality of template strings; and
a second memory portion for storing an ordered series of production rules, each production rule comprising a character field, an operator, and a substitution field comprising a list of elements and defining an initial value and a current value.

* * * * *

UNITED STATES PATENT AND TRADEMARK OFFICE
CERTIFICATE OF CORRECTION

PATENT NO. : 6,333,999 B1
DATED : December 25, 2001
INVENTOR(S) : Joseph D. Brownsmith It is certified that error appears in the above-identified patent and that said Letters Patent is hereby corrected as shown below:

<u>Title page,</u>
Item [54], Title, "ENUMERATING" should read -- ENUMERATION --.

Item [56], References Cited, U.S. PATENT DOCUMENTS, please add the following reference:
      -- 1,479,122     7/1977    Bird et al. --.

Signed and Sealed this

Fifteenth Day of April, 2003

JAMES E. ROGAN
*Director of the United States Patent and Trademark Office*